(12) United States Patent
Kwon et al.

(10) Patent No.: US 10,158,862 B2
(45) Date of Patent: *Dec. 18, 2018

(54) METHOD AND APPARATUS FOR INTRA PREDICTION WITHIN DISPLAY SCREEN

(71) Applicant: KT CORPORATION, Kyeonggi-do (KR)

(72) Inventors: Jae Cheol Kwon, Daejeon (KR); Joo Young Kim, Gyeonggi-do (KR)

(73) Assignee: KT CORPORATION, Kyeonggi-do (KR)

( * ) Notice: Subject to any disclaimer, the term of this patent is extended or adjusted under 35 U.S.C. 154(b) by 32 days.

This patent is subject to a terminal disclaimer.

(21) Appl. No.: 15/801,355

(22) Filed: Nov. 2, 2017

(65) Prior Publication Data

US 2018/0054620 A1  Feb. 22, 2018

Related U.S. Application Data

(60) Continuation of application No. 15/220,459, filed on Jul. 27, 2016, now Pat. No. 9,843,808, which is a
(Continued)

(30) Foreign Application Priority Data

May 20, 2011 (KR) .................. 10-2011-0048130
Jun. 30, 2011 (KR) .................. 10-2011-0065210

(51) Int. Cl.
*H04N 19/159* (2014.01)
*H04N 19/91* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS

| 4,903,124 A | 2/1990 | Hoshi et al. |
| 4,965,667 A | 10/1990 | Trew et al. |

(Continued)

FOREIGN PATENT DOCUMENTS

| CA | 2 763 887 A1 | 1/2011 |
| CN | 1535027 A | 10/2004 |

(Continued)

OTHER PUBLICATIONS

Rickard Sjoberg et al., "Constrained Intra source code implementation", Joint Collaborative Team on Video Coding (JCT-VC) of ITU-T SG16 WP3 and ISO/IEC JTC1/SC29/WG11 4th Meeting: Daegu, KR, Jan. 20-28, 2011.

(Continued)

*Primary Examiner* — Kaitlin A Retallick
(74) *Attorney, Agent, or Firm* — IP Legal Services, LLC

(57) ABSTRACT

The present invention relates to a method and apparatus for intra prediction. The intra prediction method for a decoder, according to the present invention, comprises the steps of entropy-decoding a received bitstream, generating reference pixels to be used in the intra prediction of a prediction unit; generating a prediction block from the reference pixels on the basis of a prediction mode for the prediction unit and reconstructing an image from the prediction block and a residual block, which is obtained as a result of entropy encoding, wherein the reference pixels and/or the prediction block pixels are predicted on the basis of a base pixel, and the predicted pixel value can be the sum of the pixel value of the base pixel and the difference between the pixel values of the base pixel and the generated pixel.

3 Claims, 16 Drawing Sheets

Related U.S. Application Data division of application No. 14/606,008, filed on Jan. 26, 2015, now Pat. No. 9,432,695, which is a division of application No. 14/118,973, filed as application No. PCT/KR2012/003744 on May 14, 2012, now Pat. No. 9,154,803.

(51) Int. Cl.

| | | |
|---|---|---|
| *H04N 19/61* | (2014.01) | |
| *H04N 19/593* | (2014.01) | |
| *H04N 19/50* | (2014.01) | |
| *H04N 19/44* | (2014.01) | |
| *H04N 19/182* | (2014.01) | |
| *H04N 19/105* | (2014.01) | |
| *H04N 19/176* | (2014.01) | |
| *H04N 19/13* | (2014.01) | |
| *H04N 19/124* | (2014.01) | |
| *H04N 19/117* | (2014.01) | |
| *H04N 19/11* | (2014.01) | |
| *H04N 19/18* | (2014.01) | |

(52) U.S. Cl.
CPC ......... *H04N 19/117* (2014.11); *H04N 19/124* (2014.11); *H04N 19/13* (2014.11); *H04N 19/176* (2014.11); *H04N 19/18* (2014.11); *H04N 19/182* (2014.11); *H04N 19/44* (2014.11); *H04N 19/50* (2014.11); *H04N 19/593* (2014.11); *H04N 19/61* (2014.11); *H04N 19/91* (2014.11)

(56) References Cited

U.S. PATENT DOCUMENTS

| | | | |
|---|---|---|---|
| 5,043,810 | A | 8/1991 | Vreeswijk et al. |
| 5,068,727 | A | 11/1991 | Haghiri et al. |
| 5,122,873 | A | 6/1992 | Golin |
| 5,144,429 | A | 9/1992 | Haghiri et al. |
| 5,335,019 | A | 8/1994 | Herz et al. |
| 7,499,492 | B1 | 3/2009 | Ameres et al. |
| 8,213,503 | B2 | 7/2012 | Tu et al. |
| 8,270,486 | B2 | 9/2012 | Song et al. |
| 8,369,628 | B2 | 2/2013 | Suzuki et al. |
| 8,446,953 | B2 | 5/2013 | Song et al. |
| 8,675,978 | B2 | 3/2014 | Sato |
| 8,842,731 | B2 | 9/2014 | Jung et al. |
| 9,154,803 | B2 * | 10/2015 | Kwon .................... H04N 19/50 |
| 9,288,503 | B2 * | 3/2016 | Kwon .................... H04N 19/50 |
| 9,432,669 | B2 * | 8/2016 | Kwon .................... H04N 19/50 |
| 9,445,123 | B2 * | 9/2016 | Kwon .................... H04N 19/50 |
| 9,756,341 | B2 * | 9/2017 | Kwon .................... H04N 19/50 |
| 2004/0164882 | A1 | 8/2004 | Touyama et al. |
| 2005/0117640 | A1 | 6/2005 | Han |
| 2005/0117647 | A1 | 6/2005 | Han |
| 2005/0265447 | A1 | 12/2005 | Park |
| 2005/0271141 | A1 | 12/2005 | Park |
| 2006/0008006 | A1 | 1/2006 | Cha et al. |
| 2006/0013320 | A1 | 1/2006 | Oguz et al. |
| 2006/0104354 | A1 | 5/2006 | Han et al. |
| 2006/0120450 | A1 | 6/2006 | Han et al. |
| 2006/0133507 | A1 | 6/2006 | Lim et al. |
| 2006/0188165 | A1 | 8/2006 | Karczewicz |
| 2006/0262858 | A1 | 11/2006 | Ishikawa |
| 2007/0003149 | A1 | 1/2007 | Nagumo et al. |
| 2007/0083578 | A1 | 4/2007 | Chen et al. |
| 2008/0089417 | A1 | 4/2008 | Bao et al. |
| 2008/0181309 | A1 | 7/2008 | Lee et al. |
| 2008/0310744 | A1 | 12/2008 | Min et al. |
| 2009/0034617 | A1 | 2/2009 | Tanaka |
| 2009/0052535 | A1 * | 2/2009 | Ugur .................... H04N 19/593 375/240.13 |
| 2009/0052555 | A1 | 2/2009 | Mak-Fan et al. |
| 2009/0141798 | A1 * | 6/2009 | Adachi ................ H04N 19/136 375/240.12 |
| 2009/0147855 | A1 | 6/2009 | Song et al. |
| 2009/0201991 | A1 | 8/2009 | Lim et al. |
| 2009/0232207 | A1 | 9/2009 | Chen |
| 2009/0232215 | A1 | 9/2009 | Park et al. |
| 2009/0262801 | A1 * | 10/2009 | Chen .................... H04N 19/176 375/240.03 |
| 2009/0316788 | A1 | 12/2009 | Techernatinsky et al. |
| 2010/0061447 | A1 | 3/2010 | Tu et al. |
| 2010/0061454 | A1 | 3/2010 | Park et al. |
| 2010/0142615 | A1 | 6/2010 | Han |
| 2010/0177821 | A1 | 7/2010 | Kadoto et al. |
| 2010/0182403 | A1 | 7/2010 | Chun et al. |
| 2010/0235530 | A1 | 9/2010 | Huang et al. |
| 2010/0284460 | A1 | 11/2010 | Tsai et al. |
| 2011/0026594 | A1 | 2/2011 | Jung et al. |
| 2011/0026599 | A1 | 2/2011 | Andersson et al. |
| 2011/0038414 | A1 | 2/2011 | Song et al. |
| 2011/0038415 | A1 | 2/2011 | Min et al. |
| 2011/0090969 | A1 | 4/2011 | Sung et al. |
| 2011/0110431 | A1 | 5/2011 | Laroche et al. |
| 2011/0249731 | A1 | 10/2011 | Zhao et al. |
| 2011/0280304 | A1 * | 11/2011 | Jeon .................... H04N 19/105 375/240.12 |
| 2012/0033736 | A1 | 2/2012 | Sato |
| 2012/0121018 | A1 | 5/2012 | Kustka et al. |
| 2012/0163457 | A1 | 6/2012 | Wahadaniah et al. |
| 2012/0195378 | A1 | 8/2012 | Zheng et al. |
| 2012/0224777 | A1 | 9/2012 | Kim et al. |
| 2012/0288004 | A1 | 11/2012 | Sato |
| 2012/0320976 | A1 | 12/2012 | Suzuki et al. |
| 2013/0016780 | A1 | 1/2013 | Oh |
| 2013/0039421 | A1 | 2/2013 | Lee et al. |
| 2013/0177079 | A1 | 7/2013 | Kim et al. |
| 2013/0272623 | A1 * | 10/2013 | Jeon .................... H04N 19/159 382/238 |
| 2013/0301941 | A1 | 11/2013 | Sato |
| 2013/0329788 | A1 | 12/2013 | Song et al. |
| 2014/0044187 | A1 | 2/2014 | Song et al. |
| 2014/0079121 | A1 | 3/2014 | Song et al. |
| 2014/0079127 | A1 | 3/2014 | Song et al. |
| 2014/0286394 | A1 | 9/2014 | Song et al. |
| 2016/0212445 | A1 | 7/2016 | Sung et al. |
| 2017/0171561 | A1 | 6/2017 | Sung et al. |

FOREIGN PATENT DOCUMENTS

| | | |
|---|---|---|
| CN | 1703096 A | 11/2005 |
| CN | 101133650 A | 2/2008 |
| CN | 101483780 A | 7/2009 |
| CN | 101523922 A | 9/2009 |
| CN | 101674475 A | 3/2010 |
| CN | 101682780 A | 3/2010 |
| CN | 102685505 A | 9/2012 |
| EP | 0322955 A1 | 7/1989 |
| EP | 0322956 A1 | 7/1989 |
| EP | 1603343 A2 | 12/2005 |
| EP | 1871117 A1 | 12/2007 |
| EP | 1603343 A3 | 10/2010 |
| EP | 2288163 A2 | 2/2011 |
| EP | 2661086 A1 | 11/2013 |
| EP | 2 958 324 A1 | 12/2015 |
| JP | 2008-522537 A | 6/2008 |
| JP | 2008-153802 A | 7/2008 |
| JP | 2008-271371 A | 11/2008 |
| JP | 2009-177352 A | 8/2009 |
| KR | 10-2005-0112445 A | 11/2005 |
| KR | 10-0679031 B1 | 2/2007 |
| KR | 10-2007-0040394 A | 4/2007 |
| KR | 10-2008-0070976 A | 8/2008 |
| KR | 10-2009-0058954 A | 6/2009 |
| RU | 2329615 C2 | 7/2008 |
| RU | 2391794 C2 | 6/2010 |
| WO | 2005/055606 A1 | 6/2005 |
| WO | 2009/131508 A2 | 10/2009 |
| WO | 2009/136743 A2 | 11/2009 |
| WO | 2010/123056 A1 | 10/2010 |

(56) References Cited

FOREIGN PATENT DOCUMENTS

| WO | 2011/021838 A2 | 2/2011 |
|---|---|---|
| WO | 2011/021844 A2 | 2/2011 |
| WO | 2012/023762 A2 | 2/2012 |
| WO | 2012/078001 A2 | 6/2012 |

OTHER PUBLICATIONS

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC/JTC1/SC29/WG11 5th Meeting: Geneva, CH, Mar. 16-23, 2011.

Yongjoon Jeon et al., "Complexity Reduction for MDIS", U.S. Appl. No. 61/475,223, Apr. 13, 2011.

Yongjoon Jeon et al., "Enhancement to MDIS", U.S. Appl. No. 61/475,225, Apr. 13, 2011.

Viktor Wahadaniah et al., "Constrained Intra Prediction Scheme for Flexible-Sized Prediction Units in HEVC", Joint Collaborative Team on Video Coding (JCT-VC) of ITU-T SG 16 WP3 and ISO/IEC JTC1/SC29/WG11 4th Meeting: Daegu, KR, Jan. 20-28, 2011, JCTVE-D094, pp. 1-8.

R. Jillani et al., "Low Complexity Intra MB Encoding in AVC/H.264", IEEE Transactions on Consumer Electronics, vol. 55, No. 1, Feb. 1, 2009, pp. 277-285.

C. Andrew Segall et al., "Spatial Scalability Within the H.264/AVC Scalable Video Coding Extension", IEEE Transactions on Circuits and Systems for Video Technology, vol. 17, No. 9, Sep. 2007, pp. 1121-1135.

Yu-Fan Lai et al., "Design of an Intra Predictor with Data Reuse for High-Profile H.264 Applications", Dept. of Electronics Engineering, IEEE, 2009, pp. 3018-3021.

Viktor Wahadaniah et al., "Constrained Intra Prediction Scheme for Flexible-Sized Prediction Units in HEVC", Document: JCTVC-D094, Joint Collaborative Team on Video Coding (JCT-VC) of ITU-T SG16 WP3 and ISO/IEC JTC1/SC29/WG11, 4th Meeting: Daegu, KR, Jan. 20-28, 2011.

Viktor Wahadaniah et al., "Constrained Intra Prediction for Flexible-Sized Prediction Units in HEVC", JCTVC-D094, 4th JCT-VC Meeting, Daegu, Jan. 20-28, 2011, Panasonic Corporation, pp. 1-14.

\* cited by examiner

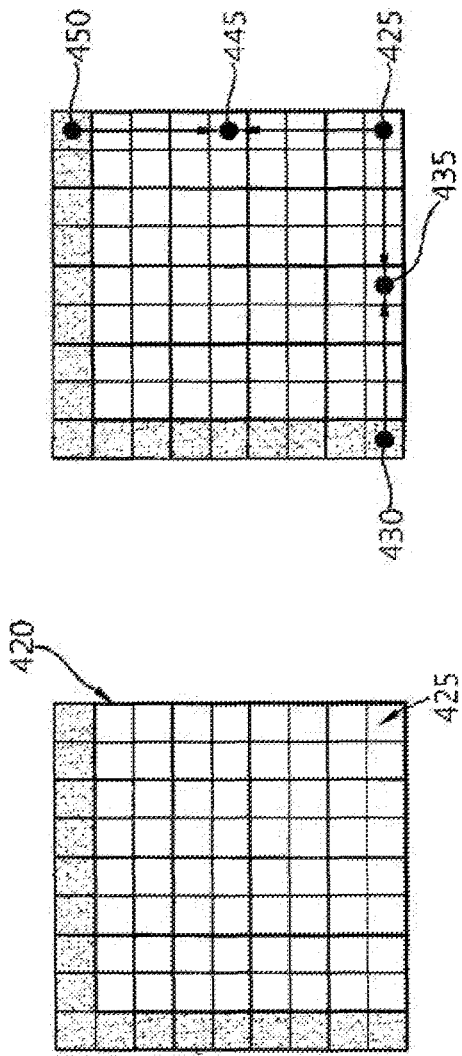
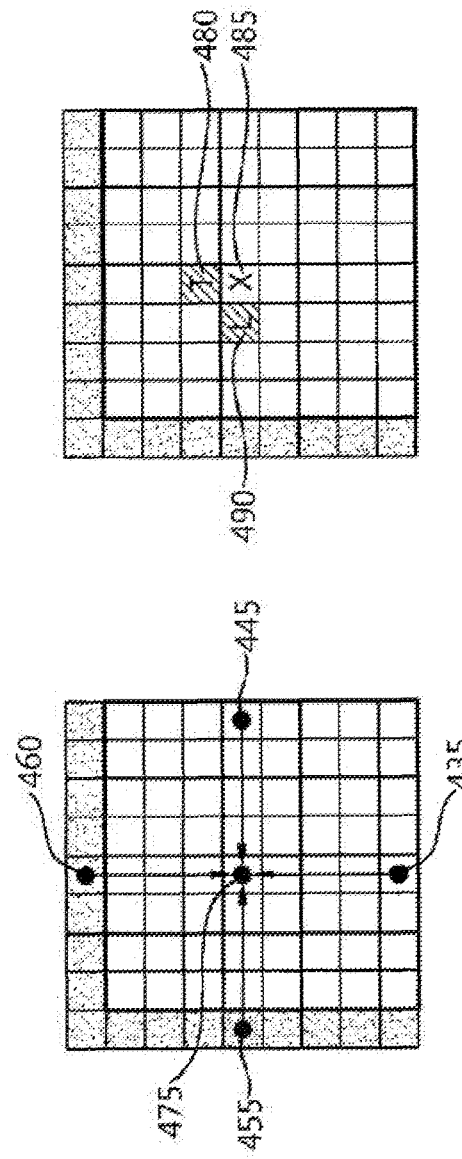

FIG. 6

| R00 | R01 | R02 | R03 | R04 | R05 | R06 | R07 | R08 |
|---|---|---|---|---|---|---|---|---|
| R10 | P11 | | | | | | | |
| R20 | | P22 | | | | | | |
| R30 | | | P33 | | | | | |
| R40 | | | | P44 | | | | |
| R50 | | | | | P55 | | | |
| R60 | | | | | | P66 | | |
| R70 | | | | | | | P77 | |
| R80 | | | | | | | | P88 |

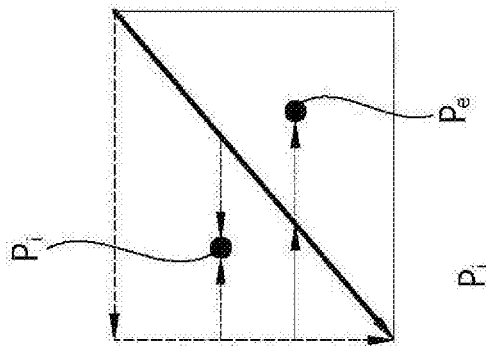
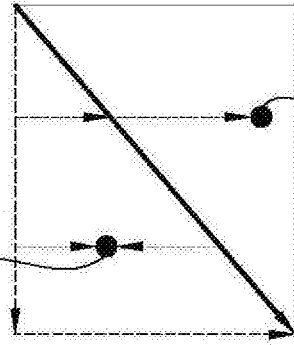
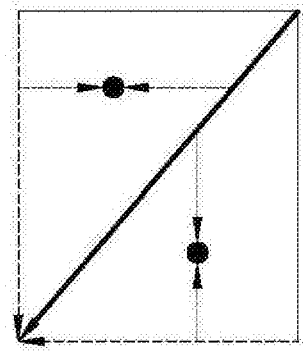
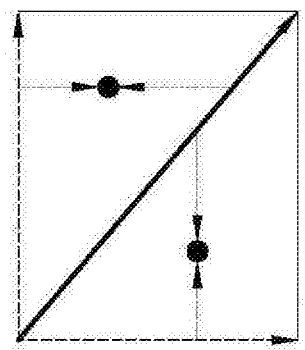
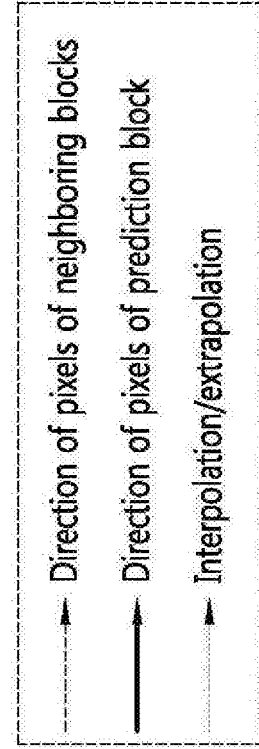
FIG. 7A  FIG. 7B  FIG. 7C  FIG. 7D

FIG. 8

| R00 | R01 | R02 | R03 | R04 | R05 | R06 | R07 | R08 |
|-----|-----|-----|-----|-----|-----|-----|-----|-----|
| R10 | P11 | P12 | P13 | P14 | P15 | P16 | P17 | P18 |
| R20 | P21 | P22 | P23 | P24 | P25 | P26 | P27 | P28 |
| R30 | P31 | P32 | P33 | P34 | P35 | P36 | P37 | P38 |
| R40 | P41 | P42 | P43 | P44 | P45 | P46 | P47 | P48 |
| R50 | P51 | P52 | P53 | P54 | P55 | P56 | P57 | P58 |
| R60 | P61 | P62 | P63 | P64 | P65 | P66 | P67 | P68 |
| R70 | P71 | P72 | P73 | P74 | P75 | P76 | P77 | P78 |
| R80 | P81 | P82 | P83 | P84 | P85 | P86 | P87 | P88 |

▨ = Intra-coded neighboring PUs
▧ = Inter-coded neighboring PUs
▭▭ = Reference samples needed for intra prediction

METHOD AND APPARATUS FOR INTRA PREDICTION WITHIN DISPLAY SCREEN

CROSS REFERENCE TO RELATED APPLICATIONS

The application is a Continuation of U.S. patent application Ser. No. 15/220,459 (filed on Jul. 27, 2016), which is a Divisional of U.S. patent application Ser. No. 14/606,008 (filed on Jan. 26, 2015), now issued as U.S. Pat. No. 9,432,695, which is a Divisional of U.S. patent application Ser. No. 14/118,973 (filed on Nov. 20, 2013), now issued as U.S. Pat. No. 9,154,803, which is a National Stage Patent Application of PCT International Patent Application No. PCT/KR2012/003744 (filed on May 14, 2012) under 35 U.S.C. § 371, which claims priority to Korean Patent Application Nos. 10-2011-0048130 (filed on May 20, 2011) and 10-2011-0065210 (filed on Jun. 30, 2011), the teachings of which are incorporated herein in their entireties by reference.

BACKGROUND

The present invention relates to a video processing technique, and more particularly, to an intra prediction method in encoding/decoding video information.

Recently, demands for high-resolution and high-quality images have increased in various fields of applications. As images have higher resolution and higher quality, amount of information on the images also increases. Accordingly, when video data is transferred using media such as existing wired and wireless broad band lines or is stored in conventional storage media, transfer and storage costs of the video data rise.

Thus, high-efficiency video compression techniques may be utilized to effectively transmit, store or reproduce images with superior resolution and superior quality.

SUMMARY

An aspect of the present invention is to provide a method of performing effective intra prediction on a texture with directionality in consideration of variations of reference pixels of neighboring blocks.

Another aspect of the present invention is to provide a method of performing planar prediction considering variations in pixel values of adjacent blocks to a prediction block in conducting intra prediction.

Still another aspect of the present invention is to provide a method of generating a reference pixel based on an intra-mode neighboring block in a position of an inter prediction mode neighboring pixel and using the reference pixel for intra prediction when constrained intra prediction (CIP) is employed.

Yet another aspect of the present invention is to provide a method of generating a reference pixel considering variations in pixel value when the reference pixel is generated based on an intra-mode neighboring block in a position of an inter prediction mode neighboring pixel.

An embodiment of the present invention provides an intra prediction method of an encoder, the method including generating reference pixels for intra prediction with respect to an input prediction unit, determining an intra mode for the prediction unit, generating a prediction block based on the reference pixels and the intra mode, and generating a residual block for the prediction unit and the prediction block, wherein at least one of the reference pixels and pixels of the prediction block is predicted based on a base pixel, and a pixel value of the predicted pixel is a sum of a pixel value of the base pixel and a variation in pixel value from the base pixel to the generated pixel.

A reference pixel of a neighboring block disposed on a top left corner of the prediction block may be set as a first base pixel, a value obtained by applying a variation in pixel value from the first base pixel to a lowest pixel among reference pixels of a neighboring block disposed on a left boundary of the prediction block and a variation in pixel value from the first base pixel to a rightmost pixel among reference pixels of a neighboring block disposed on an upper boundary of the prediction block to the base pixel may be set as a pixel value of a second base pixel as a diagonal pixel in a bottom right corner of the prediction block, and pixel values of diagonal pixels of the prediction block may be predicted from the first base pixel and the second base pixel.

Here, non-diagonal pixels of the prediction block are predicted by interpolation or extrapolation using the diagonal pixels and the pixels of the neighboring blocks on the upper and/or left boundaries of the prediction block.

Further, a reference pixel of a neighboring block disposed on a top left corner of the prediction block may be set as the base pixel, and a value obtained by applying a variation in pixel value from the base pixel to a neighboring pixel disposed in the same row as a prediction target pixel among reference pixels of a neighboring block disposed on a left boundary of the prediction block and a variation in pixel value from the base pixel to a neighboring pixel disposed in the same column as the prediction target pixel among reference pixels of a neighboring block disposed on an upper boundary of the prediction block to the base pixel may be predicted as a pixel value of the prediction target pixel.

Also, a pixel disposed in the same row or column as a prediction target pixel among pixels of neighboring blocks disposed on left or upper boundary of the prediction block may be set as the base pixel, and a value obtained by applying a variation in pixel value from the base pixel to the prediction pixel to the base pixel may be predicted as a pixel value of the prediction target pixel.

Here, the prediction target pixel may be a diagonal pixel of the prediction block, and a non-diagonal pixel of the prediction block may be predicted by interpolation using the diagonal pixel and the pixels of the neighboring blocks.

The intra prediction method may further include generating a reference pixel disposed on a boundary between an inter-mode block and the prediction unit when a block neighboring to the prediction unit is the inter-mode block, wherein a pixel disposed on a boundary of the prediction unit among pixels of an intra-mode block disposed on a left side or lower side of the reference pixel may be set as a first base pixel, a pixel disposed on the boundary of the prediction unit among pixels of an intra-mode block disposed on a right side or upper side of the reference pixel may be set as a second base pixel, and the reference pixel may be generated based on a distance from the first base pixel to the reference pixel and a distance from the second base pixel to the reference pixel.

Here, a pixel value of the first base pixel may be an average pixel value of pixels disposed on the boundary of the prediction unit among the pixels of the intra-mode block that the first base pixel belongs to, and a pixel value of the second base pixel may be an average pixel value of pixels disposed on the boundary of the prediction unit among the pixels of the intra-mode block that the second base reference belongs to. Further, a pixel value of the first base pixel may be a pixel value of the reference pixel when an intra-mode block is disposed only on the left side or lower side of the reference pixel, and a pixel value of the second base pixel may be a pixel value of the reference pixel when an intra-mode block is disposed only on the right side or upper side of the reference pixel.

Another embodiment of the present invention provides an intra prediction method of a decoder, the method including entropy-decoding a received bitstream, generating a reference pixel used for intra prediction of a prediction unit, generating a prediction block from the reference pixel based on a prediction mode for the prediction unit, and reconstructing a picture from a residual block obtained by the entropy-decoding and the prediction block, wherein at least one of the reference pixels and pixels of the prediction block is predicted based on a base pixel, and a pixel value of the predicted pixel is a sum of a pixel value of the base pixel and a variation in pixel value from the base pixel to the generated pixel.

A reference pixel of a neighboring block disposed on a top left corner of the prediction block may be set as a first base pixel, a value obtained by applying a variation in pixel value from the first base pixel to a lowest pixel among reference pixels of a neighboring block disposed on a left boundary of the prediction block and a variation in pixel value from the first base pixel to a rightmost pixel among reference pixels of a neighboring block disposed on an upper boundary of the prediction block to the base pixel may be set as a pixel value of a second base pixel as a diagonal pixel in a bottom right corner of the prediction block, and pixel values of diagonal pixels of the prediction block may be predicted from the first base pixel and the second base pixel.

Here, non-diagonal pixels of the prediction block may be predicted by interpolation or extrapolation using the diagonal pixels and the pixels of the neighboring blocks on the upper and/or left boundaries of the prediction block.

A reference pixel of a neighboring block disposed on a top left corner of the prediction block may be set as the base pixel, and a value obtained by applying a variation in pixel value from the base pixel to a neighboring pixel disposed in the same row as a prediction target pixel among reference pixels of a neighboring block disposed on a left boundary of the prediction block and a variation in pixel value from the base pixel to a neighboring pixel disposed in the same column as the prediction target pixel among reference pixels of a neighboring block disposed on an upper boundary of the prediction block to the base pixel may be predicted as a pixel value of the prediction target pixel.

Further, a pixel disposed in the same row or column as a prediction target pixel among pixels of neighboring blocks disposed on a left or upper boundary of the prediction block may be set as the base pixel, and a value obtained by applying a variation in pixel value from the base pixel to the prediction pixel to the base pixel may be predicted as a pixel value of the prediction target pixel.

Here, the prediction target pixel may be a diagonal pixel of the prediction block, and a non-diagonal pixel of the prediction block may be predicted by interpolation using the diagonal pixel and the pixels of the neighboring blocks.

The intra prediction may further include generating a reference pixel disposed on a boundary between an inter-mode block and the prediction unit when a block neighboring to the prediction unit is the inter-mode block, wherein a pixel disposed on a boundary of the prediction unit among pixels of an intra-mode block disposed on a left side or lower side of the reference pixel may be set as a first base pixel, a pixel disposed on the boundary of the prediction unit among pixels of an intra-mode block disposed on a right side or upper side of the reference pixel may be set as a second base pixel, and the reference pixel may be generated based on a distance from the first base pixel to the reference pixel and a distance from the second base pixel to the reference pixel.

Here, a pixel value of the first base pixel may be an average pixel value of pixels disposed on the boundary of the prediction unit among the pixels of the intra-mode block that the first base pixel belongs to, and a pixel value of the second base pixel may be an average pixel value of pixels disposed on the boundary of the prediction unit among the pixels of the intra-mode block that the second base reference belongs to. Further, a pixel value of the first base pixel may be a pixel value of the reference pixel when an intra-mode block is disposed only on the left side or lower side of the reference pixel, and a pixel value of the second base pixel may be a pixel value of the reference pixel when an intra-mode block is disposed only on the right side or upper side of the reference pixel.

The decoder may acquire an instruction to generate the pixels of the prediction block based on the base pixel through the entropy-decoding. Also, the decoder may acquire an instruction to generate the reference pixels based on the base pixel through the entropy-decoding.

As described above, according to the present invention, intra prediction on a texture with directionality may be achieved effectively in consideration of variations of reference pixels of neighboring blocks.

Further, planar prediction may be performed considering variations in pixel values of neighboring blocks to a prediction block, thereby enhancing prediction efficiency.

In addition, when constrained intra prediction (CIP) is employed, a reference pixel is generated based on an intra-mode neighboring block in a position of an inter-mode neighboring pixel and used for intra prediction, considering variations in pixel value, thereby enhancing prediction efficiency.

BRIEF DESCRIPTION OF THE DRAWINGS

FIG. 4A to FIG. 4D are schematically illustrates a planar prediction method.

FIG. 6 schematically illustrates that a diagonal pixel of a current prediction block is predicted first.

FIG. 7A to FIG. 7D are schematically illustrates a method of deriving other pixel values in the prediction block based on the diagonal pixel.

FIG. 8 schematically illustrates a method of predicting a pixel value considering a reference pixel value and a variation from a reference pixel.

DETAILED DESCRIPTION OF EMBODIMENTS

Figure 1:
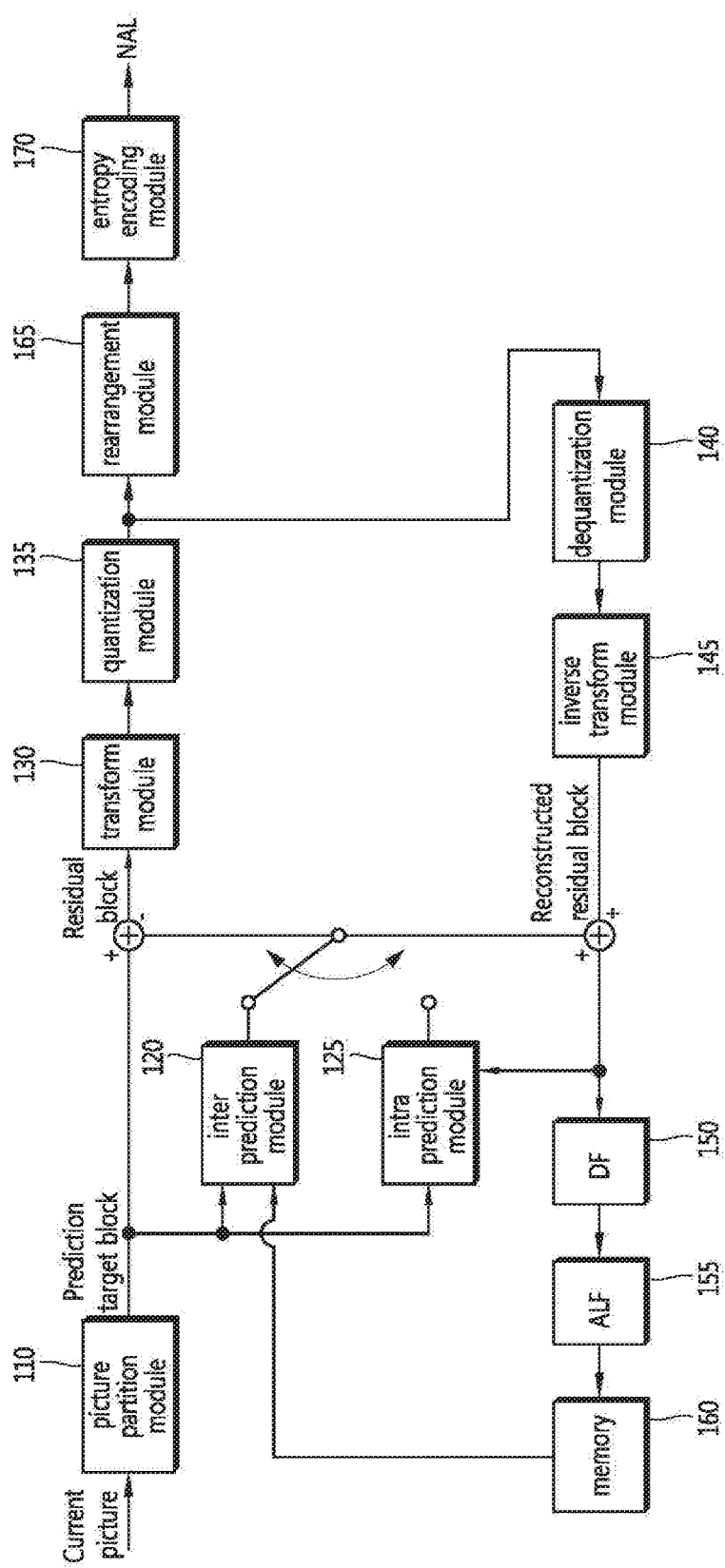
FIG. 1 is a block diagram illustrating a configuration of a video encoder according to an exemplary embodiment of the present invention.

Although elements shown in the drawings are independently shown so as to describe different features and functions of a video encoder/decoder, such a configuration does not indicate that each element is constructed by a separate hardware constituent or software constituent. That is, the elements are independently arranged and at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the present invention will be described in detail with reference to the accompanying drawings. Like reference numerals in the drawings refer to like elements throughout, and redundant descriptions of like elements will be omitted herein.

FIG. 1 is a block diagram illustrating a configuration of a video encoder according to an exemplary embodiment of the present invention. Referring to FIG. 1, the video encoder includes a picture partition module 110, an inter prediction module 120, an intra prediction module 125, a transform module 130, a quantization module 135, a dequantization module 140, an inverse transform module 145, a deblocking filter 150, a memory 160, a rearrangement module 165 and an entropy encoding module 170.

The picture partition module 110 may receive input of a current picture and divide the picture into at least one coding unit. A coding unit is a unit of encoding conducted by the video encoder and may be also referred to as a CU. A coding unit may be recursively subdivided with a depth based on a quadtree structure. A coding unit having a maximum size is referred to as a largest coding unit (LCU), and a coding unit with a minimum size as a smallest coding unit (SCU). A coding unit may have a size of 8×8, 16×16, 32×32 or 64×64. The picture partition module 110 may partition or devide the coding unit to generate a prediction unit and a transform unit. The prediction unit may be also referred to as a PU, and the transform unit may be also referred to as a TU.

In an inter prediction mode, the inter prediction module 120 may perform motion estimation (ME) and motion compensation (MC). The inter prediction module 120 generates a prediction block based on information on at least one of previous and subsequent pictures of the current picture, which may be referred to as inter-frame prediction.

The inter prediction module 120 is provided with a partitioned prediction target block and at least one reference block stored in the memory 160. The inter prediction module 120 performs motion estimation using the prediction target block and the reference block. The inter prediction module 120 generates motion information including a motion vector (MV), a reference block index and a prediction mode as a result of motion estimation.

Further, the inter prediction module 120 performs motion compensation using the motion information and the reference block. Here, the inter prediction module 120 generates and outputs a prediction block corresponding to an input block from the reference block.

The motion information is entropy-encoded to form a compressed bitstream, which is transmitted from the video encoder to a video decoder.

In an intra prediction mode, the intra prediction module 125 may generate a prediction block based on information on a pixel in the current picture. Intra prediction is also referred to as intra-frame prediction. In the intra prediction mode, a prediction target block and a reconstructed block reconstructed through encoding and decoding are input to the intra prediction module 125. Here, the reconstructed block is a picture that has not been subjected to the deblocking filter. The reconstructed block may be a previous prediction block.

Figure 2:
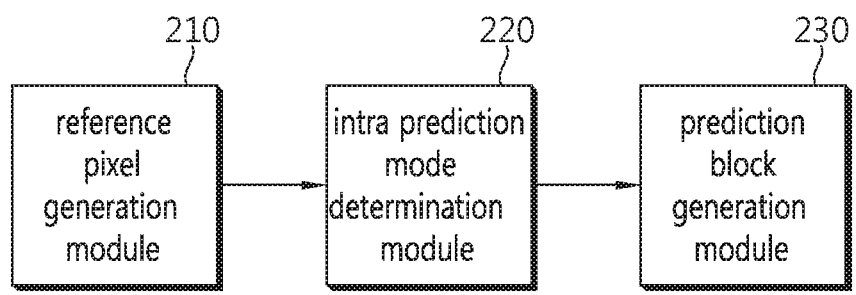
FIG. 2 is a block diagram schematically illustrating a configuration of an intra prediction module according to an exemplary embodiment of the present invention.

FIG. 2 is a block diagram schematically illustrating a configuration of the intra prediction module according to an exemplary embodiment of the present invention. Referring to FIG. 2, the intra prediction module includes a reference pixel generation module 210, an intra prediction mode determination module 220, and a prediction block generation module 230.

The reference pixel generation module 210 generates a reference pixel needed for intra prediction. Pixels in a rightmost vertical line of a left block neighboring to a prediction target block and pixels in a lowest horizontal line of an upper block neighboring to a prediction target block are used for generating the reference pixel. For example, when the prediction target block has a size of N, 2N pixels in each of left and upper directions are used as reference pixels. The reference pixel may be used as it is or via adaptive intra smoothing (AIS) filtering. When the reference pixel is subjected to AIS filtering, information about AIS filtering is signaled.

The intra prediction mode determination module 220 receives input of the prediction target block and the reconstructed block. The intra prediction mode determination module 220 selects a mode minimizing quantity of information to be encoded among prediction modes using the input picture and outputs information on the prediction mode. Here, a preset cost function or Hadamard transform may be used.

The prediction block generation module 230 receives input of the information on the prediction mode and the reference pixel. The prediction block generation module 230 spatially predicts and compensates a pixel value of the prediction target block using the information on the prediction mode and a pixel value of the reference pixel, thereby generating a prediction block.

The information on the prediction mode is entropy-encoded to form a compressed bitstream along with video data and transmitted from the video encoder to the video decoder. The video decoder uses the information on the prediction mode when generating an intra prediction block.

Referring back to FIG. 1, a differential block is generated by difference between the prediction target block and the prediction block generated in the inter or intra prediction mode and is input to the transform module 130. The transform module 130 transforms the differential block in a transform unit to generate a transform coefficient.

A transform block with a transform unit has a quadtree structure within maximum and minimum sizes and thus is not limited to a predetermined size. Each transform block has a flag indicating whether the current block is partitioned into sub-blocks, wherein when the flag is 1, the current transform block may be split into four sub-blocks. Discrete cosine transform (DCT) may be used for transformation.

The quantization module 135 may quantize the values transformed by the transform module 130. A quantization coefficient may change based on a block or importance of a picture. The quantized transform coefficient may be provided to the rearrangement module 165 and the dequantization module 140.

The rearrangement module 165 may change a two-dimensional (2D) block of the transform coefficients into a one-dimensional (1D) vector of transform coefficients by scanning so as to enhance efficiency in entropy encoding. The rearrangement module 165 may change scanning order based on stochastic statistics to enhance entropy encoding efficiency.

The entropy encoding module 170 entropy-encodes the values obtained by the rearrangement module 165, and the encoded values are formed into a compressed bitstream, which is stored or transmitted through a network abstraction layer (NAL).

The dequantization module 140 receives and dequantizes the transform coefficients quantized by the quantization module 135, and the inverse transform module 145 inverse-transforms the transform coefficients, thereby generating a reconstructed differential block. The reconstructed differential block is merged with the prediction block generated by the inter prediction module 120 or the intra prediction module 125 to generate a reconstructed block. The reconstructed block is provided to the intra prediction module 125 and the deblocking filter 150.

The deblocking filter 150 filters the reconstructed block to remove a distortion on a boundary between blocks that occurs in encoding and decoding processes and provides a filtered result to an adaptive loop filter (ALF) 155.

The ALF 155 performs filtering to minimize an error between the prediction target block and the final reconstructed block. The AFL 155 performs filtering based on a value resulting from comparison of the reconstructed block filtered by the deblocking filter 150 and the current prediction target block, and a filter coefficient information on the ALF 155 is loaded into a slice header and transmitted from the encoder to the decoder.

The memory 160 may store the final reconstructed block obtained through the ALF 155, and the (final) stored reconstructed block may be provided to the inter prediction module 120 to perform inter prediction.

Figure 3:
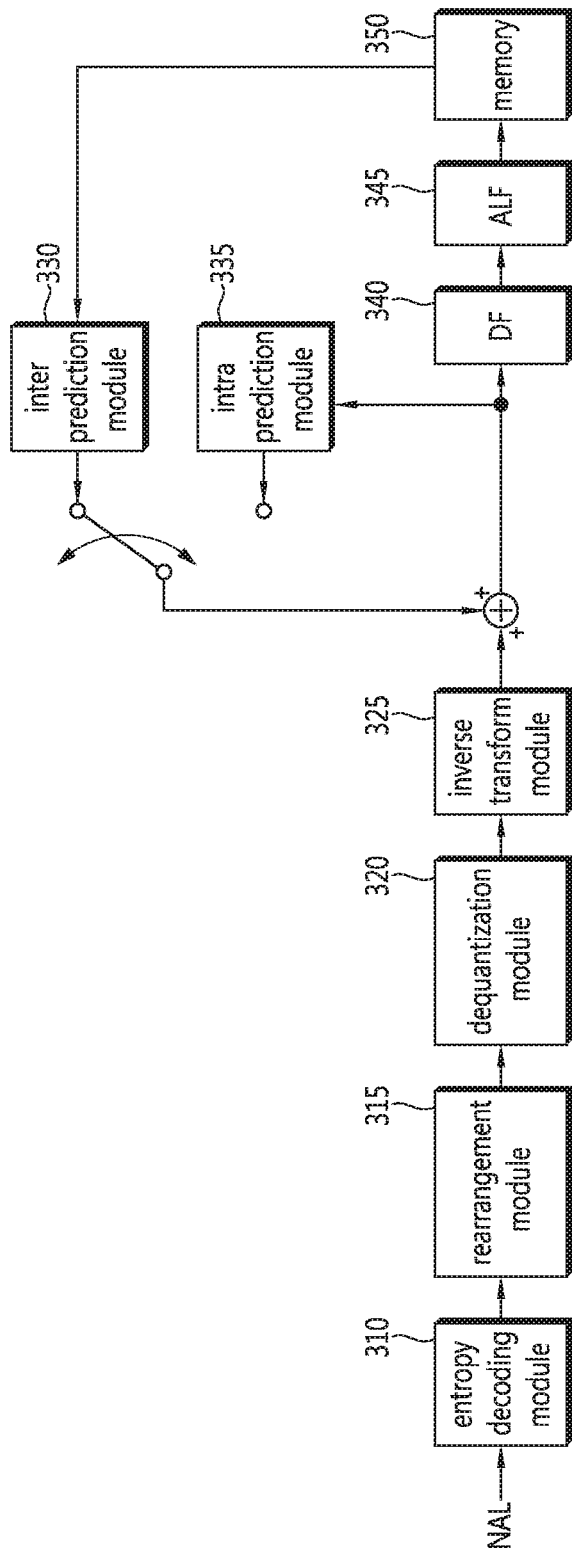
FIG. 3 is a block diagram illustrating a configuration of a video decoder according to an exemplary embodiment of the present invention.

FIG. 3 is a block diagram illustrating a configuration of a video decoder according to an exemplary embodiment of the present invention. Referring to FIG. 3, the video decoder includes an entropy decoding module 310, a rearrangement module 315, a dequantization module 320, an inverse transform module 325, an inter prediction module 330, an intra prediction module 335, a deblocking filter 340, an ALF 345, and a memory 350.

The entropy decoding module 310 receives a compressed bitstream from an NAL. The entropy decoding module 310 entropy-decodes the received bitstream, and also entropy-decodes a prediction mode and motion vector information if the bitstream includes the prediction mode and the motion vector information. An entropy-decoded transform coefficient or differential signal is provided to the rearrangement module 315. The rearrangement module 315 inverse-scans the transform coefficient or differential signal to generate a 2D block of transform coefficients.

The dequantization module 320 receives and dequantizes the entropy-decoded and rearranged transform coefficients. The inverse transform module 325 inverse-transforms the dequantized transform coefficients to generate a differential block.

The differential block may merge with a prediction block generated by the inter prediction module 330 or intra prediction module 335 to generate a reconstructed block. The reconstructed block is provided to the intra prediction module 335 and the deblocking filter 340. The inter prediction module 330 and the intra prediction module 335 may perform the same operations as the inter prediction module 120 and the intra prediction module 125 of the video encoder.

The deblocking filter 340 filters the reconstructed block to remove a distortion on a boundary between blocks that occurs in encoding and decoding processes and provides a filtered result to the ALF 345. The ALF 345 performs filtering to minimize an error between the prediction target block and the finally reconstructed block. The memory 160 may store the final reconstructed block obtained through the ALF 345, and the stored (final) reconstructed block may be provided to the inter prediction module 330 to perform inter prediction.

Meanwhile, in an area with insignificant changes in texture, for example, a monotonous background of the sky or sea, planar intra prediction is used to further enhance encoding efficiency.

Intra prediction is classified into directional prediction, DC prediction and planar prediction, wherein planar prediction may be an extended concept of DC prediction. Although planar prediction may be broadly included in DC prediction, planar prediction may cover a prediction method that DC prediction does not deal with. For example, DC prediction is preferable for a uniform texture, while planar prediction is effective for block prediction in a pixel values having directionality.

The present specification illustrates a method of improving planar prediction efficiency with respect to a texture with directionality using variations in pixel values of reference pixels of neighboring blocks.

FIG. 4A to FIG. 4D schematically illustrate a planar prediction method.

Referring to FIG. 4A, a pixel value 425 of a pixel in a bottom right corner of a current block 420 is predicted. The pixel value 425 of the pixel on the bottom right corner of the current block may be predicted as a DC value.

Referring to FIG. 4B, pixel values of pixels located on a right boundary of the current block and pixel values of pixels located on a bottom boundary of the current block are predicted. For example, a pixel value 445 located on the right boundary of the current block may be predicted by linear interpolation of a pixel value 450 of an upper block and the DC value 425. Further, a pixel value 435 located on the bottom boundary of the current block may be predicted by linear interpolation of a pixel value 430 of a left block and the DC value 425.

Referring to FIG. 4C, pixel values of remaining pixels, other than the pixel on the bottom right corner, the pixels on the right boundary and the pixels on the bottom boundary in the current block, may be predicted by bilinear interpolation using the pixel values of the upper and left blocks and the already predicted pixel values in the current block. For example, a pixel value 475 in the current block may be predicted by interpolation using a pixel value 460 of the upper block, a pixel value 455 of the left block, the already predicted pixel value 445 located on the right boundary of the current block and the already predicted pixel value 435 located on the bottom boundary of the current block.

Referring to FIG. 4D, the prediction samples (predicted samples) obtained via the foregoing process may be refined. For example, a pixel value X 485 in the current block may be refined using an upper sample value T 480 and a left sample value L 490. Specifically, X' refined from X may be obtained by X'={(X<<1)+L+T+1}>>2. Here, "x<<y" indicates that a two's complement integer expression of x is arithmetically shifted to the left by a binary unit y, while "x>>y" indicates that the two's complement integer expression of x is arithmetically shifted to the right by the binary unity.

Figure 5B:
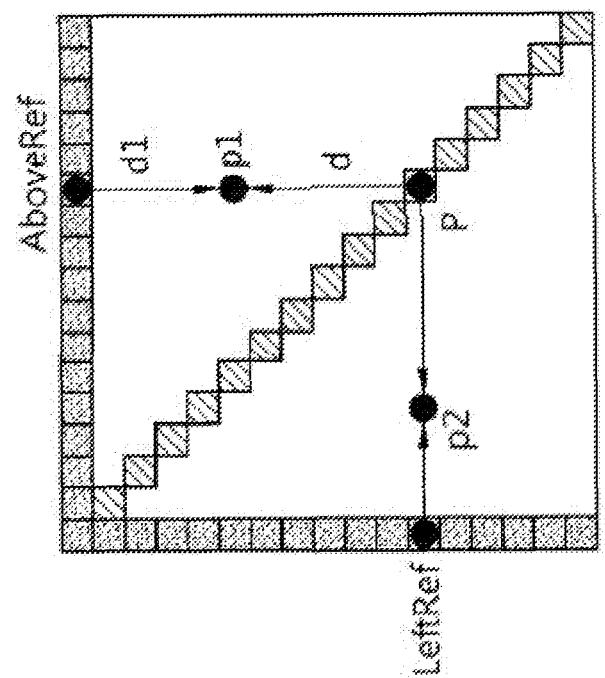
FIG. 5A and FIG. 5B are schematically illustrates an alternative planar prediction method.
Figure 5A:
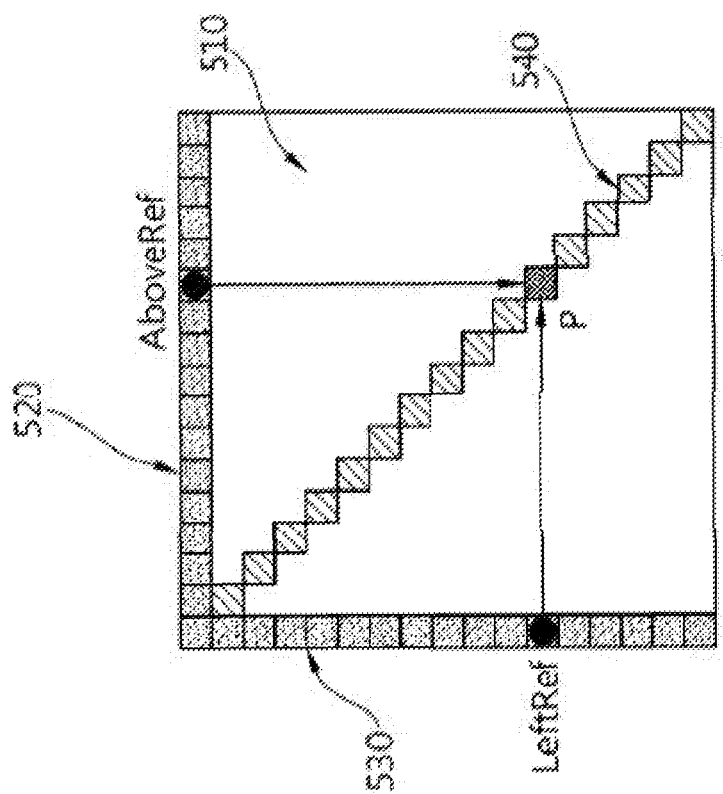

FIG. 5A and FIG. 5B schematically illustrate an alternative planar prediction method.

In the method of FIG. 5A and FIG. 5B, pixel values of pixels diagonally located in a current pixel are predicted first, and pixel values of remaining pixels in the current block are predicted using the predicted pixel values. For convenience of description, the pixels located diagonally from the top left to the bottom right among the pixels constructing the block are referred to as diagonal pixels below.

Referring to FIG. 5A, pixel values of diagonal pixels 540 of a current block 510 are predicted using a pixel value 520 of an upper reference block and a pixel value 530 of a left reference block. For instance, a pixel value of a diagonal pixel P in the current block may be obtained using a pixel value of a pixel AboveRef located on a boundary between the current block and the upper block among pixels of the upper block and a pixel value of a pixel LeftRef located on a boundary between the current block and the left block among pixels of the left block by P=(LeftRef+AboveRef+1)>>1.

Referring to FIG. 5B, pixel values of pixels in the current block 510 other than the diagonal pixels 540 may be obtained by linear interpolation using the pixel value obtained in FIG. 5A and pixel values of the pixels of the upper and left blocks on the boundaries. For example, P1 may be obtained using the pixel AboveRef of the upper block and the obtained diagonal pixel P by P1=(AboveRef*d2+P*d1)/(d1+d2). Further, P2 may be obtained by P2=(LeftRef*d3+P*d4)(d3+d4).

Meanwhile, the planar prediction methods illustrated in FIG. 4A to FIG. 4D and FIG. 5A and FIG. 5B are effective for a uniform texture without directionality, whereas these methods may have reduced efficiency in prediction in a case of a texture with directionality, such as luma pixels in which luminance changes substantially in one direction, for example, a horizontal direction, but hardly changes in another direction, for example, a vertical direction.

Thus, planar intra prediction considering variations in pixel value may be needed. Planar intra prediction according to the present invention selects or predict a base pixel value and applies variations in pixel values between a base pixel and a target pixel to the base pixel value, thereby predicting a pixel value of the target pixel.

Hereinafter, examples of the present invention will be described with reference to the drawings.

Example 1

FIG. 6 schematically illustrates that a diagonal pixel Pii of a current prediction block is predicted first. Although FIG. 6 illustrates an 8×8 prediction block for convenience of description, the present invention may be also applied to an N×N prediction block, without being limited to the 8×8 prediction block.

In Example 1 shown in FIG. 6, the diagonal pixels of the current prediction block are predicted first based on a reference pixel (Ri0 and/or R0j, 0≤i, j≤8 in 8×8 prediction block case) of a reference block neighboring to the current prediction block.

That is, after the diagonal pixels Pii are obtained, other pixel values in the prediction block may be derived by interpolation or extrapolation using reference pixel values (Rij) of the neighboring block and the Pii.

FIG. 7A to FIG. 7D schematically illustrate a method of deriving the other pixel values in the prediction block based on the diagonal pixels.

In the present invention, planar prediction is carried out in consideration of changes in pixel values. For example, as shown in FIG. 7A, when the reference pixel values increase both in an x direction (right) and in a y direction (down), pixel values in the prediction block are also more likely to increase in a bottom-right direction. In this case, a pixel value of P88 on a bottom right corner of the prediction block may be predicted first, and other pixels may be predicted based on the pixel value of P88.

To predict the value of P88, defining a pixel value of reference pixel R00 on a top left corner of the current prediction block as a pixel value of base pixel, a variation from the base pixel to the prediction target pixel P88 in the prediction block may be applied to the pixel value of the base pixel. For example, a pixel value of the target pixel P88 may be obtained by Equation 1. For convenience of description, Rij or Pij illustrated in the drawings and the specification are presented as $R_{i,j}$ and $P_{i,j}$.

$$P_{8,8} = R_{0,0} + \sqrt{(R_{0,8}-R_{0,1})^2 + (R_{8,0}-R_{1,0})^2} \qquad \text{[Equation 1]}$$

When P88 is obtained, the other diagonal pixels Pii may be obtained by Equation 2.

$$P_{i,i} = R_{0,0} + \frac{i}{8} \cdot (P_{8,8} - R_{0,0}) \qquad \text{[Equation 2]}$$

Here, since the present example illustrates the 8×8 prediction block, i may be 1, 2, . . . , 8. Although Example 1 illustrates the 8×8 prediction block for convenience of description, in an N×N prediction block, Pii may be obtained as Pii=R00+(i/N)P88.

As shown in FIG. 7B, even when the reference pixel value decrease both in the x direction (right) and in the y direction (down), a pixel value of P88 in the bottom right corner of the prediction block may be derived in consideration of variations in decreasing pixel values, and the other pixel values may be predicted based on the pixel value of P88. In this case, P88 may be derived by Equation 3.

$$P_{8,8} = R_{0,0} - \sqrt{(R_{0,8}-R_{0,1})^2 + R_{8,0}-R_{1,0})^2} \qquad \text{[Equation 3]}$$

When P88 is obtained, the other diagonal pixels in the prediction block may be obtained by Equation 4.

$$P_{i,i} = R_{0,0} + \frac{i}{8} \cdot (P_{8,8} - R_{0,0}) \qquad \text{[Equation 4]}$$

Here, i may be 1, 2, . . . , 8.

As shown in FIG. 7C, when the reference pixel values increase in a top-right direction, the diagonal pixels located from the bottom left to the top right in the prediction block are derived first based on variations in pixel values, unlike in FIG. 7A and FIG. 7B. For example, a pixel value of P81 in a bottom left corner of the prediction block is derived, and the remaining pixel values may be predicted based on the pixel value of P81. In this case, P81 may be derived by Equation 5.

$$P_{8,1} = R_{0,9} - \sqrt{(R_{0,8}-R_{0,1})^2 + (R_{8,0}-R_{1,0})^2}$$ [Equation 5]

When P81 is obtained, the remaining diagonal pixels (bottom left to top left) in the prediction block may be derived by Equation 6.

$$P_{i,9-i} = R_{0,9} + \frac{i}{8} \cdot (P_{8,1} - R_{0,9})$$ [Equation 6]

Here, i may be 1, 2, ..., 8.

Also, as shown in FIG. 7D, when the reference pixel values increase in a bottom-left direction, the diagonal pixels located from the bottom left to the top right in the prediction block are derived first based on variations in pixel values. For example, the pixel value of P81 in the bottom left corner of the prediction block is derived, and the remaining pixel values may be predicted based on the pixel value of P81. In this case, P81 may be derived by Equation 7.

$$P_{8,1} = R_{0,9} + \sqrt{(R_{0,8}-R_{0,0})^2 + (R_{8,0}-R_{0,0})^2}$$ [Equation 7]

When P81 is obtained, the remaining diagonal pixels (bottom left to top left) in the prediction block may be derived by Equation 8.

$$P_{i,9-i} = R_{0,9} + \frac{i}{8} \cdot (P_{8,1} - R_{0,9})$$ [Equation 8]

Here, i may be 1, 2, ..., 8.

In view of calculation loads, approximation of the calculations of square roots to derive the diagonal pixels may be considered as in Equation 9.

$$\Delta x + \Delta y \approx \sqrt{\Delta x^2 + \Delta y^2}$$ [Equation 9]

Subsequently, the other pixel values in the prediction block may be derived by interpolation or extrapolation using the prediction values of the diagonal pixels, upper reference pixel values and left reference pixel values.

In FIG. 7A and FIG. 7B, the pixels Pij in the prediction block may be derived by interpolation using the diagonal pixels Pii and reference pixels R of the neighboring block. Here, an interpolation shown in Equation 10 may be used.

$$P_{i,j} = (R_{0,j}*d_2 + P_{i,i}*d_1)/(d_1+d_2) \text{ or}$$

$$P_{i,j} = (R_{i,0}*d_2 + P_{i,i}*d_1)/(d_1+d_2)$$ [Equation 10]

Here, $d_1$ is a distance from the pixel R0j or Rj0 of the neighboring block used for interpolation to the prediction target pixel Pij, and $d_2$ is a distance from the diagonal pixel Pii used for interpolation to the prediction target pixel Pij.

Further, in FIG. 7C and FIG. 7D, the pixel Pi derived by interpolation among the pixels in the prediction block may be derived by Equation 11.

$$P_{i,j} = (R_{i,0}*d_2 + P_{i,i}*d_1)/(d_1+d_2) \text{ or}$$

$$P_{i,j} = (R_{i,0}*d_2 + P_{i,9-i}*d_1)/(d_1+d_2)$$ [Equation 11]

Here, i+j<9, and $d_1$ is a distance from the pixel R0j or Rj0 of the neighboring block used for interpolation to the prediction target pixel Pij, and $d_2$ is a distance from the diagonal pixel Pii used for interpolation to the prediction target pixel Pij. Here, although Equation 11 is used for interpolation to derive the pixel Pij of the prediction block, various interpolation methods may be employed in the present invention, without being limited thereto.

Meanwhile, in FIG. 7C and FIG. 7D, there is a pixel Pe derived by extrapolation among the pixels of the prediction block. Here, an extrapolation shown in Equation 12 may be used to derive the pixel in the prediction block.

$$P_{i,j} = R_{i,0} + (P - R_{i,0}) * \left(1 + \frac{d_2}{d_1}\right) \text{ or}$$

$$P_{i,j} = R_{0,j} + (P - R_{0,j}) * \left(1 + \frac{d_2}{d_1}\right)$$ [Equation 12]

In this case, i+j>9 and P is a diagonal pixel used for extrapolation. Further, as described above, $d_1$ and $d_2$ are a distance from the reference pixel to the prediction target pixel Pij and a distance from the pixel Pii to the prediction target pixel Pij, respectively.

Example 2

FIG. 8 schematically illustrates another method of predicting a pixel value considering a base pixel value and a variation from a base pixel. Although FIG. 8 illustrates an 8×8 prediction block for convenience of description, the present invention may be also applied to an N×N prediction block, without being limited to the 8×8 prediction block.

FIG. 8 illustrates a reference pixel P00 located on the top left corner of the prediction block as a base pixel. In Example 2, a prediction target pixel Pij is derived by applying vertical and horizontal variations from the reference pixel to the base pixel value.

For example, the target pixel Pij is derived by Equation 13.

$$Pij = R00 + \Delta x + \Delta y$$ [Equation 13]

Here, Δy=Ri0−R00, Δx=R0j−R00, and 1≤i, j≤8 in the 8×8 prediction block case.

For example, referring to FIG. 8, a pixel P33 is derived by P33=R00+Δx+4 according to Equation 7. Here, Δx and Δy are variations in pixel value in the x direction and the y directions from the base pixel R00 to P33.

Alternatively, referring to FIG. 8, a pixel P76 is derived by P76=R00+Δx'+Δy' according to Equation 13. Here, Δx' and Δy' are variations in pixel value in the x direction and the y directions from the base pixel R00 to P76.

Example 3

Figures 9A, 9B:
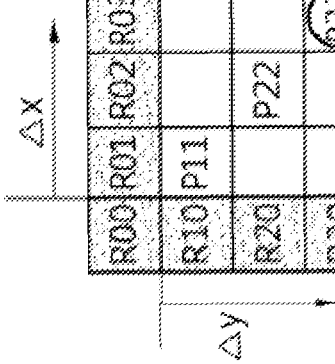
FIG. 9A and FIG. 9B are schematically illustrates a method of deriving diagonal pixels of a prediction block first and then pixel values of remaining pixels.

FIG. 9A and FIG. 9B schematically illustrate another method of deriving diagonal pixels of a prediction block first and then pixel values of remaining pixels.

Although FIG. 5A and FIG. 5B illustrate that the diagonal pixels are derived based on an average value of two pixels in a horizontal/vertical direction of a neighboring block to the current prediction block, Example 3 shown in FIG. 9A and FIG. 9B drive the diagonal pixels in consideration of variations.

Referring to FIG. 9A, the diagonal pixels of the prediction block are predicted using pixel values of neighboring blocks located on upper and/or left boundaries of the prediction block. For example, the diagonal pixels Pii is predicted by Equation 14.

$$P_{i,i}=R_{0,i}+\Delta y \text{ or}$$

$$P_{i,i}=R_{i,0}+\Delta x \qquad \text{[Equation 14]}$$

For example, referring to FIG. 9A, P33 may be predicted by P33=R03+Δy or P33=R30+Δx according to Equation 14. Δx and Δy are variations in pixel value in the x direction from a base pixel R30 to P33 and in the y direction from a base pixel R03 to P33, respectively.

Referring to FIG. 9B, other pixels Pij of the current block than the diagonal pixels may be predicted by linear interpolation using the prediction values of the diagonal pixels and reference pixels R00, R10 to R80 and R01 to R08 of the neighboring blocks on the upper and left boundaries of the current block.

For example, a pixel value Pij may be predicted by Equation 15.

$$Pij = \frac{R0j \times d2 + Pii \times d1}{d1 + d2} \text{ or} \qquad \text{[Equation 15]}$$

$$Pij = \frac{Ri0 \times d2 + Pii \times d1}{d1 + d2}$$

d1 is a distance from the pixel R0j or Pi0 of the neighboring blocks used for interpolation to the prediction target pixel Pij, and d2 is a distance from the diagonal pixel Pii used for interpolation to the prediction target pixel Pij.

Example 4

Figures 10A, 10B:
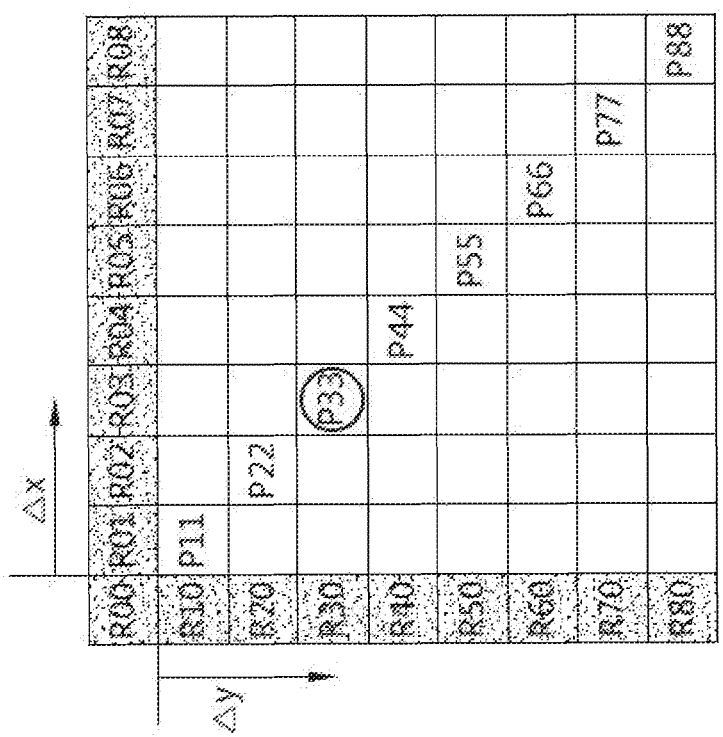
FIG. 10A and FIG. 10B are schematically illustrates that diagonal pixels are derived first and other pixels than the diagonal pixels are derived in the same method as used for the diagonal pixels.

FIG. 10A and FIG. 10B schematically illustrate that diagonal pixels are derived first and other pixels than the diagonal pixels are derived in the same method as used for the diagonal pixels.

In FIG. 10A and FIG. 10B, the diagonal pixels may be predicted in the same manner as illustrated in FIG. 9A and FIG. 9B. Thus, referring to FIG. 10A, a diagonal pixel P33 of a current prediction block may be predicted by P33=R03+Δy or P33=R30+Δx.

Subsequently, other pixels Pij of the current block than the diagonal pixels may be predicted by linear interpolation using the prediction values of the diagonal pixels and reference pixels R00, R10 to R80 and R01 to R08 of neighboring blocks on upper and left boundaries of the current block.

Here, the same method as used for deriving diagonal pixels may be used. For example, a pixel Pij may be predicted by Equation 16.

$$Pij=R0j+\Delta y \text{ or}$$

$$Pij=Ri0+\Delta x \qquad \text{[Equation 16]}$$

Here, Δy=Ri0−R00, Δx=R0j−R00, and 1≤i, j≤8 in the 8×8 prediction block case.

For example, referring to FIG. 10A and FIG. 10B, P37 may be derived by P37=R07+Δy or P37=R70+Δx according to Equation 16.

Meanwhile, accumulation of minor errors resulting from integer arithmetic by the encoder or decoder for a long time may cause a serious error. Further, when a transmission error occurs in a neighboring block to a current block, a mismatch arises between the encoder and the decoder or the error spread. For example, when an error occurs in the neighboring block, pixel values on a boundary of the neighboring block are changed. In this case, when the decoder uses a pixel with a changed pixel value as a reference pixel, the error spreads to the current block. Thus, a tool to prevent such a problem is needed, for example, an encoding tool such as constrained intra prediction (CIP).

Figure 11:
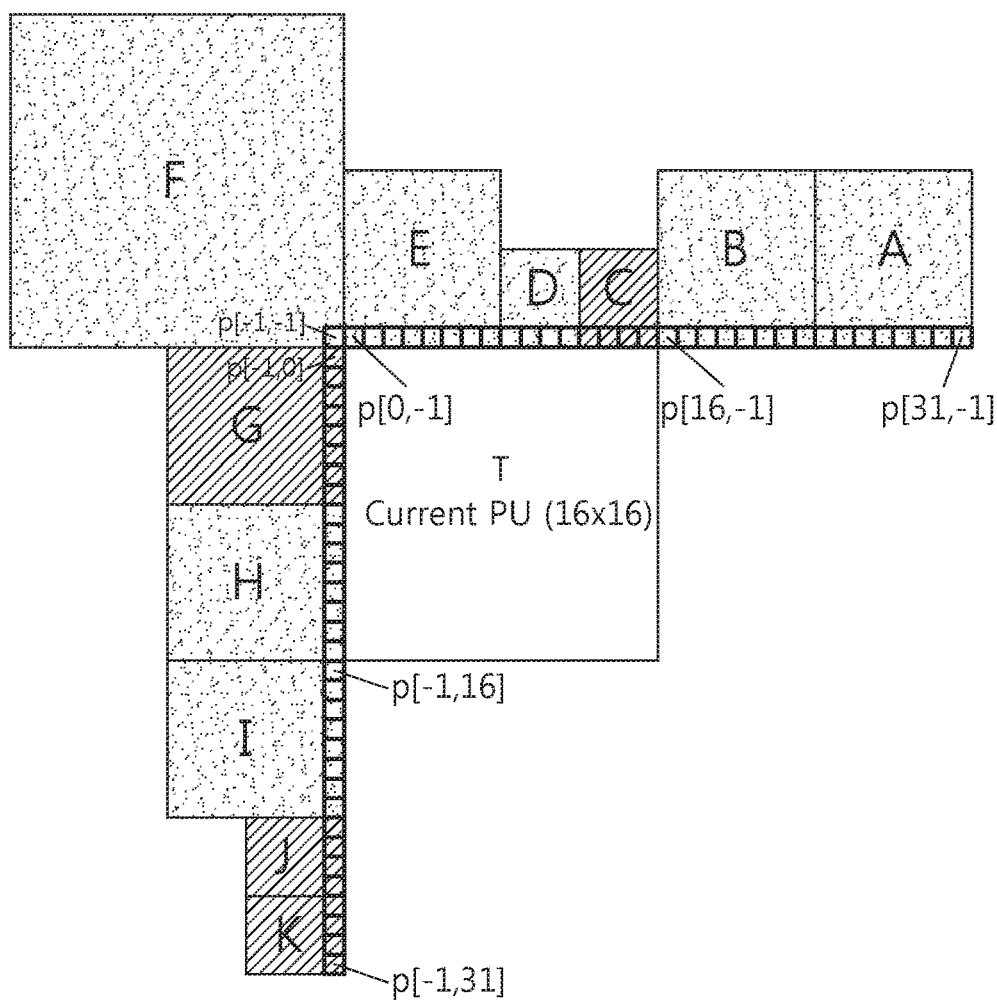
FIG. 11 schematically illustrates an CIP method.

FIG. 11 schematically illustrates an CIP method.

In the method of FIG. 11, if there is any one inter prediction mode block neighboring to a current macroblock T, a DC intra prediction mode is used only and a DC prediction value is fixed to 128.

Here, a pixel value of a block predicted by the inter prediction mode among the neighboring blocks is not used as a reference pixel value. Thus, in this method, a DC prediction mode is compulsorily employed excluding even available information, for example, neighboring intra prediction mode pixels.

Figure 12:
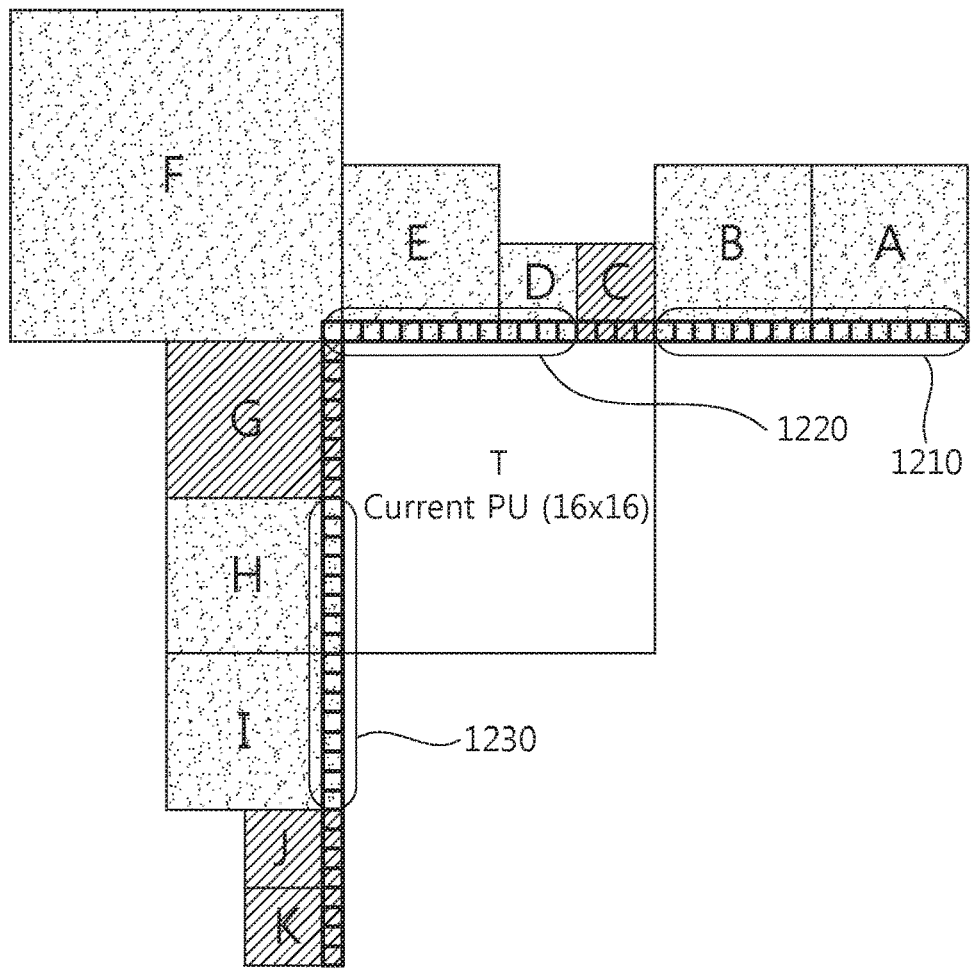
FIG. 12 schematically illustrates an alternative CIP method.

FIG. 12 schematically illustrates an alternative CIP method.

In the method of FIG. 12, a pixel value of a block predicted in the intra prediction mode among neighboring blocks is used as a reference pixel value, and a pixel value of a block predicted in the inter prediction mode is derived using neighboring intra prediction mode blocks. Thus, not only the DC mode but other intra prediction modes may be used.

Referring to FIG. 12, among neighboring blocks to a current prediction block T, pixel values 1210, 1220 and 1230 of blocks A, B, D, E, F, H and I predicted by the inter prediction mode are derived using pixels of blocks predicted by the intra prediction mode.

For example, when predicted pixels of intra prediction mode are present on both right and left sides of a target inter-prediction sample, a pixel value $P_T$ of a block predicted by the inter prediction mode is derived by Equation 17.

$$P_T=(P_{LB}+P_{RA}+1)>>1 \qquad \text{[Equation 17]}$$

Here, $P_T$ is a target inter-prediction sample, $P_{LB}$ is a left or lower intra-prediction sample, and $P_{RA}$ is a right or upper intra-prediction sample. Further, when an intra-prediction sample is present on either side of the target inter-prediction sample only, a pixel value $P_T$ of a block predicted by the inter prediction mode is derived by Equation 18.

$$P_T=P_{RA} \text{ or } P_T=P_{LB} \qquad \text{[Equation 18]}$$

The method of FIG. 12 utilizes the intra prediction mode more properly than the method of FIG. 11 but uses an average value of available intra prediction mode pixel values or an available intra prediction mode pixel value itself as a pixel value of a neighboring block predicted in the inter prediction mode, without considering variation in pixel values.

Thus, a CIP method considering variations in pixel value is needed.

Example 5

Figure 13:
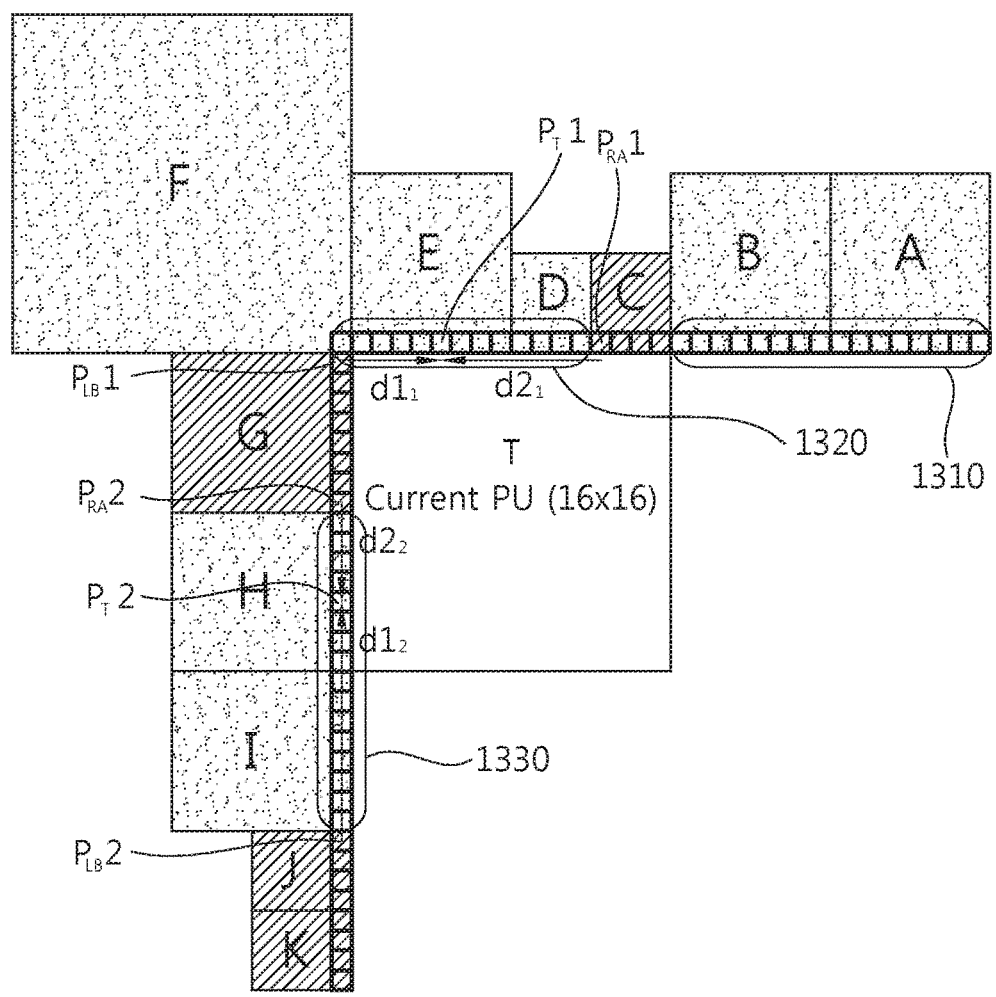
FIG. 13 schematically illustrates that a system according to the present invention conducts CIP in consideration of variations in pixel value.

FIG. 13 schematically illustrates that a system according to the present invention performs CIP in consideration of variations in pixel value.

The method of FIG. 13 using variations in pixel values of both pixels for interpolation achieves more accurate prediction of a target pixel value than the method of FIG. 12 using an average value of both pixel values as a pixel value to derive. For example, a target pixel PT among pixel values 1310, 1320 and 1330 to be derived may be derived by Equation 19.

$$P_T = \frac{P_{LB} \times d2 + P_{RA} \times d1}{d1 + d2} \quad \text{[Equation 19]}$$

Here, $P_T$ is a target prediction sample, $P_{LB}$ is a left or lower intra-prediction sample, and $P_{RA}$ is a right or upper intra-prediction sample. Further, as shown in FIG. 13, d1 is a distance from $P_{LB}$ to $P_T$, and d2 is a distance from $P_{RA}$ to $P_T$.

For instance, referring to FIG. 13, $P_T1$ may be derived by $(P_{LB}1*d2_1+P_{RA}1*d1_1)/(d1_1+d2_1)$, and $P_T2$ may be derived by $(P_{LB}2*d2_2+P_{RA}2*d1_2)/(d1_2+d2_2)$.

If an intra-prediction sample to be used for interpolation is present on either right and left sides or either upper and lower sides of the target prediction sample $P_T$ only, $P_T=P_{LB}$ or $P_T=P_{RA}$. Further, if there is no block predicted in the intra prediction mode neighboring to the target prediction block T, a pixel value in the same position as in a previous picture may be copied for use as a reference pixel value.

Average values of intra pixels on the boundary may be used as $P_{LB}$ or $P_{RA}$ value. For example, in FIG. 3, when $P_T$ is located in a lower pixel row 1320 of an E block or D block, an average value of four lowest pixels of an intra prediction mode C block may be used as $P_{RA}$, and an average value of eight rightmost pixels of a G block may be used as $P_{LB}$. In this case, a reference point of d1 is a top pixel among the rightmost pixels of the G block, and a reference point of d2 is a leftmost pixel among the lowest pixels of the C block.

Further, linear interpolation gives smoothing effect on boundary pixels and thus adaptive intra smoothing (AIS) may be off. Here, in the DC prediction mode, filtering on pixels on a boundary of the prediction block may be on.

Figure 14:
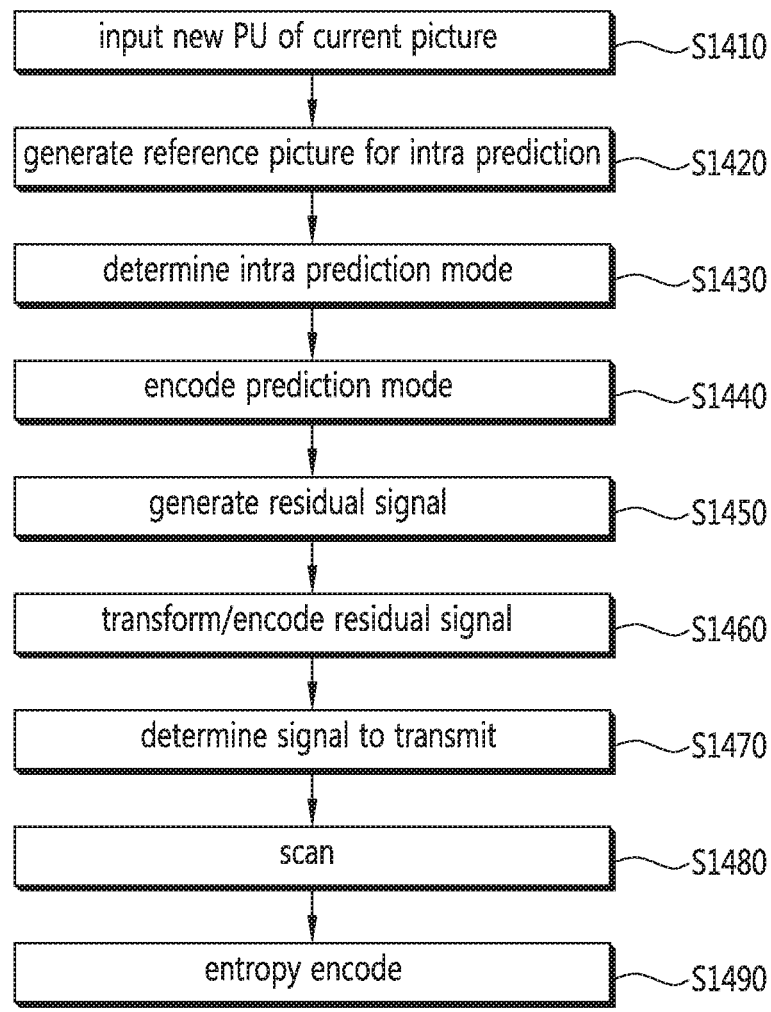
FIG. 14 is a flowchart schematically illustrating an operation of the encoder in the system according to the present invention.

FIG. 14 is a flowchart schematically illustrating an operation of the encoder in the system according to the present invention.

Referring to FIG. 14, a new prediction unit of a current picture is input (S1410). The prediction unit (PU) may be a basic unit for intra prediction and inter prediction. The prediction unit may be a smaller block than a coding unit (CU) and may be a rectangular shape, not necessarily a square shape. Intra prediction of the prediction unit is basically carried out by a 2N×2N or N×N block.

Subsequently, a reference pixel needed for intra prediction is derived (S1420). Pixels in a rightmost vertical line of a left block neighboring to a current prediction block and pixels in a lowest horizontal line of an upper block neighboring to the current prediction block are used for generating the reference pixel. When the prediction block has an N size, 2N pixels of the left and upper blocks are used in total as reference pixels.

Here, the pixels in the rightmost vertical line of the left block neighboring to the current prediction block and the pixels in the lowest horizontal row of the upper block neighboring to the current prediction block may be used as the reference pixels as they are or via smoothing.

When smoothing is involved, smoothing information may be also signaled to the decoder. For example, when smoothing is performed, an AIS filter may be employed, in which filter coefficients [1, 2, 1] or [1, 1, 4, 1, 1] may be used. Among these two coefficients, the latter filter coefficient may provide a sharper boundary. As mentioned above, information including whether to use a filter, a type of a filter to use and a filter coefficient may be signaled to the decoder.

Meanwhile, when CIP is used for generating the reference pixel, a CIP_flag value is set to 1. When CIP is applied, only pixels of neighboring blocks encoded in the intra prediction mode are used as reference pixels and pixels of the neighboring blocks encoded in the inter prediction mode are not used as reference pixels. In this case, as shown in FIG. 13, pixels (target prediction samples) corresponding to positions of the pixels of the neighboring blocks encoded in the inter prediction mode are generated as reference pixels by interpolating the neighboring reference pixels encoded in the intra prediction mode, or the neighboring reference pixels encoded in the intra prediction mode are copied and used as reference pixels corresponding to positions of the pixels of the neighboring blocks encoded in the inter prediction mode.

For example, when intra prediction mode prediction pixels are present on both right and left sides, and upper and lower sides of a target inter-prediction sample, the target prediction sample $P_T$ located in a block predicted in the inter prediction mode may be derived by Equation 11. Further, when an intra-prediction sample is present only on either side of the target prediction sample, the target prediction sample $P_T$ located in a block location predicted in the inter prediction mode may be derived by Equation 12. In Equation 11 and/or Equation 12, average values of the corresponding intra prediction mode pixels may be used as $P_{LB}$ and P values. If there is no neighboring block predicted in the intra prediction mode, a pixel value in the same position as in a previous picture may be copied for use as a reference pixel value.

Since linear interpolation gives smoothing effect on boundary pixels, it may be effective to turn AIS off in use of CIP.

Subsequently, an intra prediction mode is determined (S1430).

The intra prediction mode is determined by a prediction unit (PU), in which an optimal prediction mode is determined in view of relationship between required bit rate and amount of distortion.

For example, when rate distortion optimization (RDO) is on, a mode to minimize cost J=R+rD (R is bit rate, D is amount of distortion, and r is a Lagrange variable) may be selected. Here, thorough local decoding is needed, in which case complexity may increase.

When RDO is off, a prediction mode to minimize a mean absolute difference (MAD) by subjecting a prediction error to Hadamard transform may be selected.

Table 1 illustrates a number of prediction modes with respect to a luma component according to size of a prediction unit block.

TABLE 1

| Block size | Number of prediction modes |
|---|---|
| 4 × 4 | 17 |
| 8 × 8 | 34 |
| 16 × 16 | 34 |
| 32 × 32 | 34 |
| 64 × 64 | 3 |

Figure 15:
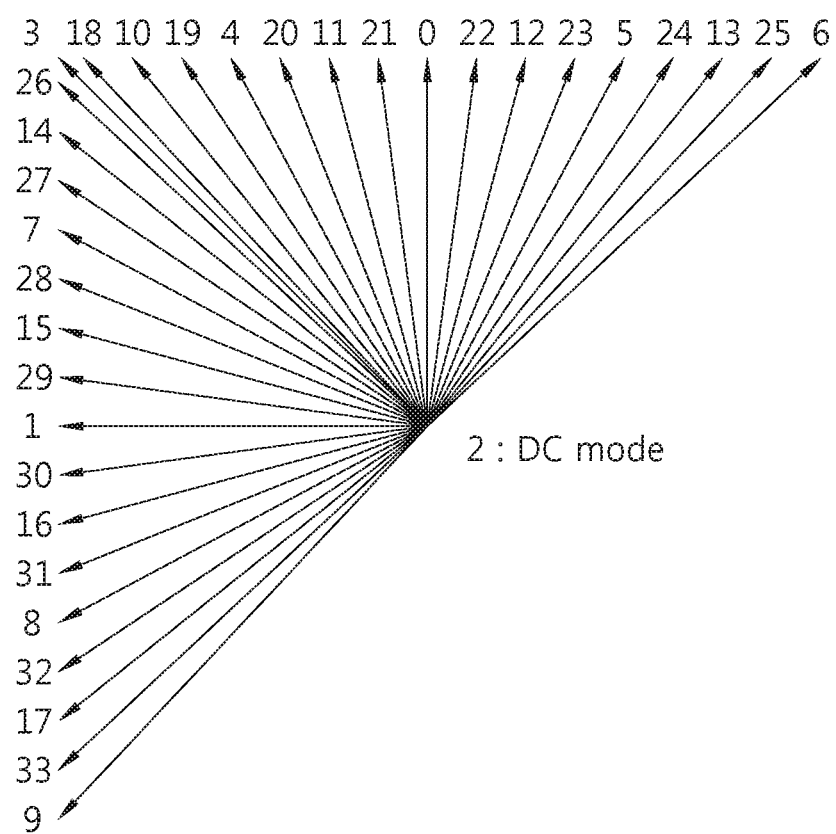
FIG. 15 illustrates a prediction direction of an intra prediction mode.

FIG. 15 illustrates a prediction direction of an intra prediction mode. Referring to FIG. 15, a mode number 0 is a vertical mode in which prediction is conducted in a vertical direction using a pixel value of a neighboring block. A mode number 1 is a horizontal mode in which prediction is conducted in a horizontal direction using a pixel value of a neighboring block. A mode number 2 is a DC mode in which a prediction block is generated using an average pixel value of a current prediction target block, for example, a luma value in the case of luma pixels and a chroma value in the case of chroma pixels. In other modes shown in FIG. 15, prediction is conducted using pixel values of neighboring blocks depending on corresponding angles.

In the DC mode, top prediction pixels and leftmost prediction pixels may be filtered to enhance prediction efficiency. Here, intensity of filtering may become higher for a smaller block. The other internal pixels in the current prediction block may not be filtered.

Meanwhile, a planar mode to reflect directionality may be used instead of the DC mode. In the planar mode, a Planar_flag value among information transmitted from the encoder to the decoder is set to 1. When the planar mode is used, the DC mode is not used. Thus, when the DC mode is used instead of the planar mode, the Planar_flag value is set to 0.

When the planar mode is employed, the same prediction methods as described above in FIGS. 6 to 10 may be used. Here, the decoder may perform an RDO operation described above so as to select optimal method. If necessary, two or more methods of the foregoing methods may be used together. The encoder signals to the decoder information on which method the encoder selects among the prediction methods in the planar mode illustrated in FIGS. 6 to 10.

Regarding a reference pixel of a chroma component, unified directional intra (UDI) of a luma block may be employed as it is in a mode number 4, which is referred to as a DM mode. In a mode number 0, a prediction block is generated using linear relationship between a luma and a chroma, which is referred to as a linear model (LM) mode. A mode number 1 is a vertical mode, in which prediction is carried out in the vertical direction, and corresponds to the mode number 0 of the luma. A mode number 2 is a horizontal line, in which prediction is carried out in the horizontal direction, and corresponds to the mode number 1 of the luma. A mode number 3 is a DC mode, in which a prediction block is generated using an average chroma value of a current prediction target block, and corresponds to the mode number 2 of the luma.

Referring back to FIG. 14, the encoder encodes a prediction mode of the current block (S1440). The encoder encodes a prediction mode for a luma component block and a chroma component block of the current prediction block. Here, since the prediction mode of the current prediction target block highly correlates with a prediction mode of a neighboring block, the current prediction target block is encoded using the prediction mode of the neighboring block, thereby reducing bit amount. Further, a most probable mode (MPM) of the current prediction target block is determined, and accordingly the prediction mode of the current prediction target block may be encoded using the MPM.

Subsequently, a pixel value of the current prediction block and a differential value by a pixel for the pixel value of the prediction block are derived, thereby generating a residual signal (S1450).

The generated residual signal is transformed and encoded (S1460). The residual signal may be encoded using a transform kernel, wherein the transform encoding kernel has a 2×2, 4×4, 8×8, 16×16, 32×32 or 64×64 size.

A transform coefficient C is generated for the transform, which may be a 2D block of transform coefficients. For example, for an n×n block, a transform coefficient may be calculated by Equation 20.

$$C(n,n) = T(n,n) \times B(n,n) \times T(n,n)^T$$ [Equation 20]

Here, C(n, n) is an n*n transform coefficient matrix, T(n, n) is an n*n transform kernel matrix, and B(n, n) is an n*n matrix for a prediction target block.

When m=hN, n=2N and h=½, a transform coefficient C for an m*n or n*m differential block may be obtained by two methods. First, the m*n or n*m differential block is split into four m*m blocks and a transform kernel is applied to each block, thereby generating the transform coefficient. Alternatively, a transform kernel is applied to the m*n or n*m differential block, thereby generating the transform coefficient.

The encoder determines which to transmit among the residual signal and the transform coefficient (S1470). For instance, when prediction is adequately performed, the residual signal may be transmitted as it is without transform encoding.

Determining which to transmit among the residual signal and the transform coefficient may be carried out by RDO or the like. Cost functions before and after transform encoding are compared to immunize costs. When a signal type to transmit, that is, the residual signal or transform coefficient, for the current prediction block is determined, a type of the transmitted signal is also signaled to the decoder.

Subsequently, the encoder scans the transform coefficient (S1480). A quantized 2D block of transform coefficients may be changed into a 1D vector of transform coefficients by scanning.

The scanned transform coefficient and the intra prediction mode are entropy-encoded (S1490). The encoded information is formed into a compressed bit stream, which may be transmitted or stored through an NAL.

Figure 16:
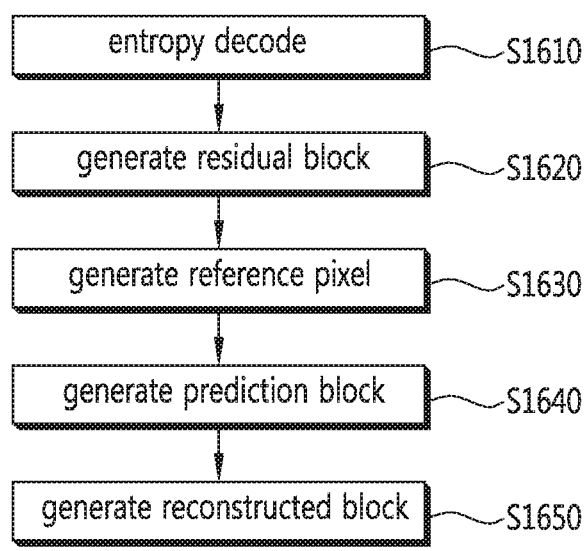
FIG. 16 is a flowchart schematically illustrating an operation of the decoder in the system according to the present invention.

FIG. 16 is a flowchart schematically illustrating an operation of the decoder in the system according to the present invention.

Referring to FIG. 16, the decoder entropy-decodes a received bitstream (S1610). Here, a block type may be obtained from a variable length coding (VLC) table, and a prediction mode of a current decoding target block may be derived. When the received bit stream may include side information needed for decoding, such as information on a coding unit, a prediction unit and a transform unit, information on AIS filtering, information on limitation of a prediction mode count, information on unused prediction modes, information on rearrangement of prediction modes, information on transform methods and information on scanning methods, the side information is entropy-decoded along with the bit stream.

The decoded information may confirm whether a transmitted signal for the current decoding target block is a residual signal or a transform coefficient for a differential block. A residual signal or 1D vector of transform coefficients for the differential block is obtained for the current decoding target block.

Subsequently, the decoder generates a residual block (S1620).

The decoder inversely scans the entropy-decoded residual signal or transform coefficient to generate a 2D block. Here, a residual block is may be generated from the residual signal, and a 2D block of transform coefficients may be generated from the transform coefficient.

The transform coefficients are dequantized. The dequantized transform coefficients are inversely transformed, and the residual block for the residual signal is generated via inverse transformation. Inverse transformation of an n*n block may be expressed by Equation 11.

The decoder generates reference pixels (S1630). Here, the decoder generates the reference pixel by referring to information on whether AIS filtering is applied and on a used filter type signaled and transmitted by the encoder. Likewise in the encoding process, pixels in a rightmost vertical line of a left block already decoded and reconstructed and neighboring to the current decoding target block and pixels in a lowest horizontal line of an upper block neighboring to the decoding target block are used for generating the reference pixel.

Meanwhile, when a CIP_flag value received by the decoder is set to 1, which means that the encoder uses CIP for a target picture, the decoder generates the reference pixel accordingly. For example, only pixels of neighboring blocks encoded in the intra prediction mode are used as reference pixels, whereas pixels of the neighboring blocks encoded in the inter prediction mode are not used as reference pixels. In this case, as illustrated in FIG. 6, pixels (target prediction samples) corresponding to positions of the pixels of the neighboring blocks encoded in the inter prediction mode are generated as reference pixels by interpolating the neighboring reference pixels encoded in the intra prediction mode, or the neighboring reference pixels encoded in the intra prediction mode may be copied and used as reference pixels corresponding to positions of the pixels of the neighboring blocks encoded in the inter prediction mode.

For example, when intra prediction mode prediction pixels are present on both right and left sides and upper and lower sides of a target inter-prediction sample, the target prediction sample $P_T$ located in a block predicted in the inter prediction mode is derived by Equation 17. Further, when an intra-predicted sample is present only on either side of the target prediction sample, the target prediction sample $P_T$ located in a block location predicted in the inter prediction mode may be derived by Equation 18. In Equation 17 and/or Equation 18, average values of the corresponding intra prediction mode pixels may be used as $P_{LB}$ or $P_{RA}$ values. If there is no neighboring block predicted in the intra prediction mode, a pixel value in the same position as in a previous picture may be copied for use as a reference pixel value.

When the encoder employs AIS filtering, that is, when smoothing is applied and thus AIS is on, the decoder also performs AIS filtering in generating the reference pixel according to the reference pixel generation method used by the encoder. The decoder may determine a filter coefficient based on filter type information among the received information. For example, when there are two filter coefficients [1, 2, 1] or [1, 1, 4, 1, 1], a filter coefficient indicated in the filter type information may be used among the two filter coefficients.

Next, a prediction block for the decoding target block is generated using the reference pixel and the entropy-decoded prediction mode of the current decoding target block (S1640).

A process of generating the prediction block is the same as a process of determining the prediction mode and generating the prediction block by the encoder. When the prediction mode of the current block is a planar mode, a planner prediction method used to generate the prediction block may be identified by analyzing signaled information. Here, the decoder may generate the prediction block based on the identified information according to a used mode among the planner modes illustrated in FIGS. 6 to 10.

Next, a block reconstructed by adding, by a pixel, a pixel value of the prediction block and a pixel value of the differential block, that is, a reconstructed block, is generated (S1670).

The invention claimed is:

1. A method of decoding a video signal with a decoding apparatus, comprising:
   obtaining a residual sample of a current block;
   deriving reference samples based on neighboring samples adjacent to the current block, the reference samples being used for an intra prediction of the current block;
   performing the intra prediction on the current block based on the reference samples;
   deriving a reconstruction sample of the current block using a prediction sample derived by performing the intra prediction and the residual sample; and
   applying a deblocking filter to the reconstruction sample of the current block,
   wherein deriving the reference samples comprises:
   determining, based on a prediction mode of a neighboring block, whether at least one of the neighboring samples included in the neighboring block is an unavailable sample, the prediction mode specifying whether the neighboring block is coded in an inter prediction or the intra prediction; and
   performing a substitution for the unavailable sample which is not used for the intra prediction of the current block by using a sample located on one side of the unavailable sample among the neighboring samples adjacent to the current block when the unavailable sample is present among the neighboring samples adjacent to the current block,
   wherein when the unavailable sample corresponds to at least one of left neighboring samples other than a top-left neighboring sample, the substitution of the unavailable sample is performed using only a bottom neighboring sample of the unavailable sample, without referring to a top neighboring sample of the unavailable sample, and
   wherein when the unavailable sample corresponds to at least one of top neighboring samples, the substitution of the unavailable sample is performed using a left neighboring sample of the unavailable sample.

2. The method of claim 1, wherein determination of whether the at least one of neighboring samples is the unavailable sample is based on a constrained intra prediction flag in addition to the prediction mode relating to the neighboring block, the constrained intra prediction flag specifying whether at least one of the neighboring samples included in the neighboring block coded in the inter prediction is used for the intra prediction of the current block.

3. The method of claim 2, wherein when the prediction mode relating to the neighboring block indicates that the neighboring block is coded in the inter prediction and a value of the constrained intra prediction flag is set to 1, the neighboring sample included in the neighboring block is determined to be the unavailable sample.

* * * * *